UNITED STATES PATENT OFFICE.

IRA F. PAYSON, OF NEW YORK, N. Y.

IMPROVEMENT IN SOAP INGREDIENTS.

Specification forming part of Letters Patent No. 10,296, dated December 6, 1853.

*To all whom it may concern:*

Be it known that I, IRA F. PAYSON, of the city, county, and State of New York, have invented a new and Improved Mode of Manufacturing Soap, of which the following is a specification.

The nature of my invention consists in the employment of sal-ammoniac in the manufacture of soap in combination, in part or in whole, with wheat-flour, potatoes, borax, sal-soda, "meen fun," or satin-white and fuller's-earth, or their equivalents, the combination being a soap which maintains its consistency in all states of the atmosphere, either moist or dry, and which will wash in water, hard or soft, retaining a sufficient amount of moisture in dry places not to become indurated, or yielding too readily to dampness.

To enable others skilled in the art to make and use my invention, I will proceed to describe its ingredients and quantities, and their combination, as follows:

Put three gallons of water in a kettle of convenient size and heat to nearly boiling-point, but do not let it boil during the process. Then add fifty pounds of meen-fun or satin-white, (a product made from clay and sold as an article of commerce in England and France,) stirring constantly while adding. Then add one hundred pounds of fuller's soap, made in the usual way from tallow, and continue stirring until it is thoroughly melted. Then add twenty-five pounds of potatoes finely pulverized. In five minutes after add two pounds of sal-soda, finely pulverized, also half a pound of sal-ammoniac and two pounds of wheat-flour made into a thin paste, and half a pound of finely-pulverized borax, stirring for fifteen minutes over a gentle fire, until it is thoroughly mixed together, when your soap is done and ready to turn out into coolers. In twenty-four hours it is ready for use.

Should your soap get to boiling while making, and frothy, you will have to add more fuller's soap, as nothing else will take up.

What I claim as my improvement or invention, and desire to secure by Letters Patent, is—

The use of sal-ammoniac as an ingredient of my soap, in combination with the other ingredients, the effect of which is to retain a sufficient amount of moisture to prevent drying up, and at the same time not enough to cause it to become damp by exposure to damp air.

IRA F. PAYSON.

Witnesses:
  F. S. MYERS,
  J. G. BERRET.